United States Patent [19]

Hager et al.

[11] Patent Number: 4,462,904

[45] Date of Patent: Jul. 31, 1984

[54] PULSED REGENERATION OF ADSORPTION COLUMN

[75] Inventors: Donald G. Hager, Tucson, Ariz.; Michael L. Massey, Covington, Va.; Frederick Rubel, Jr., Tucson, Ariz.

[73] Assignee: Westvaco Corporation, New York, N.Y.

[21] Appl. No.: 502,565

[22] Filed: Aug. 8, 1983

Related U.S. Application Data

[62] Division of Ser. No. 357,566, Mar. 12, 1982, Pat. No. 4,416,798.

[51] Int. Cl.³ .............................................. B01J 19/04
[52] U.S. Cl. .................................... 210/177; 210/189; 210/274
[58] Field of Search ............... 210/675, 175, 177, 189, 210/269, 268, 274

[56] References Cited

U.S. PATENT DOCUMENTS

| | | | |
|---|---|---|---|
| 3,192,126 | 6/1965 | Fear | 210/189 |
| 3,298,950 | 1/1967 | Mindler | 210/189 |
| 3,436,343 | 4/1969 | Smith | 210/673 |
| 3,700,592 | 10/1972 | DePree | 210/675 |
| 3,973,986 | 8/1976 | Schoenrock et al. | 210/675 |
| 4,237,007 | 12/1980 | Marquardt | 210/189 |

Primary Examiner—Ivars C. Cintins
Attorney, Agent, or Firm—W. A. Marcontell; R. L. Schmalz

[57] ABSTRACT

An activated carbon adsorption column for the treatment of waste water is continuously sterilized and/or regenerated in pulsed batches of carbon amounting to 5 to 25 percent of the working column quantity transferred, alternately, from the influent face of the column to one of two, off-stream blow case vessels for steam processing and returned to the effluent face of the working column upon the next programmed pulsing interim.

2 Claims, 1 Drawing Figure

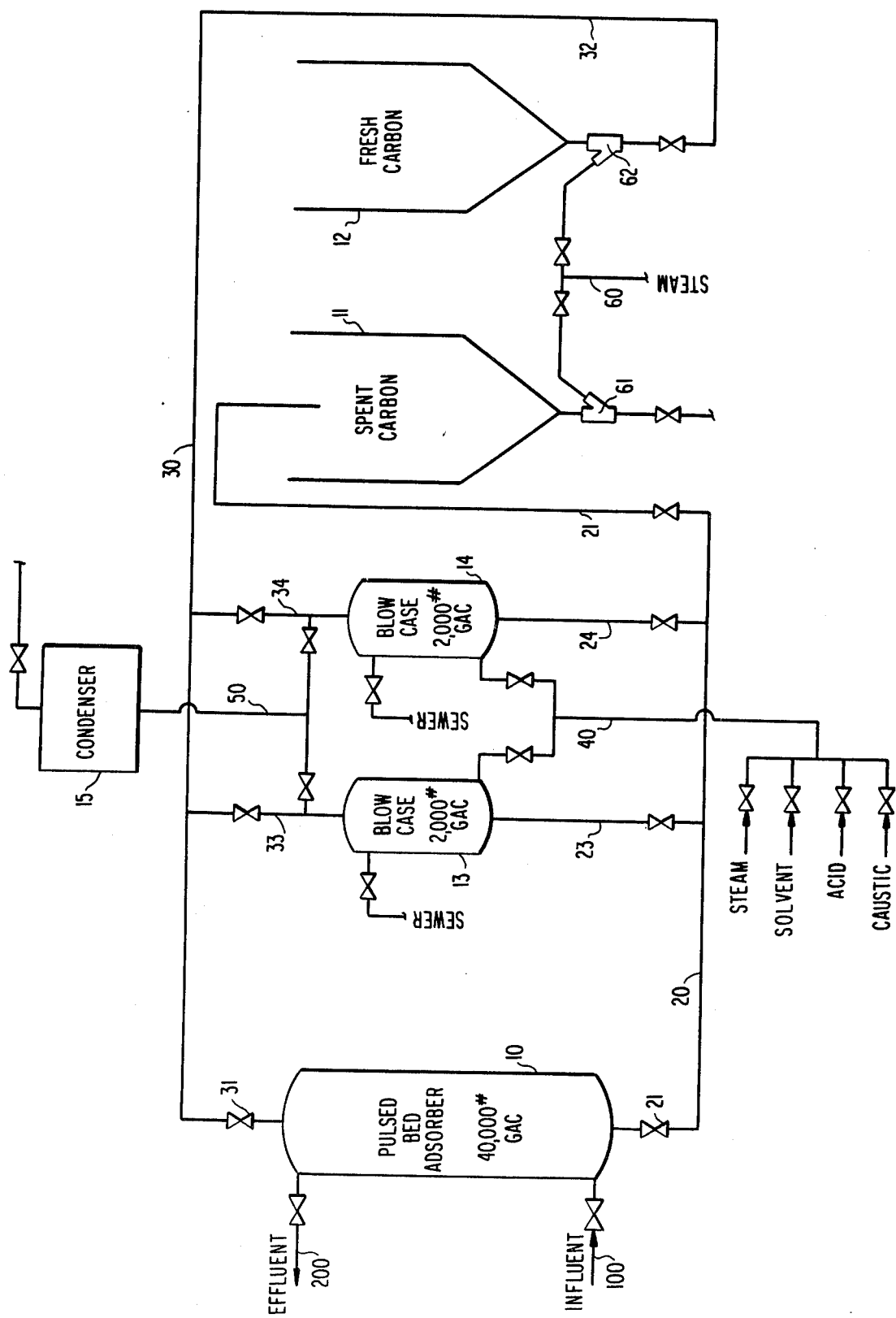

PULSED REGENERATION OF ADSORPTION COLUMN

This is a division of application Ser. No. 357,566, filed 3-12-82, now U.S. Pat. No. 4,416,798.

BACKGROUND OF THE INVENTION

1. Field Of The Invention

The present invention relates to activated carbon adsorption systems for removal of certain compounds or contaminants from water and other fluid flow streams. More particularly, the present invention relates to a method and apparatus for continuous pulsed regeneration and sterilization of activated carbon used in the bed of an adsorption column.

2. Description Of The Prior Art

Activated carbon is a substance derived from coal, wood and other carbonaceous materials having great porosity, permeability and pore surface area. For reason of such great pore area, activated carbon is an excellent adsorber from water of dissolved organic and some inorganic compounds. When such carbon affinitive compounds are considered contaminants to a water stream, the contaminations may be removed by merely flow contacting the water stream with a bed or slurry of activated carbon.

Beds of activated carbon are also effective to remove, via filtration, bacteria from potable and process water streams. As a consequence, however, bacteria are trapped by the carbon bed in a climate favorable to growth and proliferation. As the bacteria colonies grow in the carbon bed, the stream flow is restricted and the effluent water stream from the bed is contaminated.

Disinfecting compounds such as chlorine, chlorine dioxide and chloramines as would normally be used to control such bacteria growth are ineffective in an activated carbon bed due to neutralization of the disinfectant by carbon adsorption.

Accordingly, bacteria growth control within an activated carbon bed must be accomplished by such means as frequent backwashing followed by caustic washing and steam sterilization. But backwashing may only be used in unconfined beds i.e. contact volumes of carbon contained within vessels of substantially greater volume. Packed filter beds in which the carbon bed occupies substantially all of the vessel volume are not susceptible to backwashing. In these cases, steam/or caustic may be used.

Independent of confined carbon bed plugging and sterilization problems due to in situ bacteria growth, each activated carbon particle or granule may be compared to an independent vessel. Notwithstanding the affinity of activated carbon for certain compounds, the capacity for such is finite. Eventually, the particle vessel fills: a condition characterized as saturated or spent. When this occurs, the particle is of no further value for the adsorbent purpose and must be either replaced or regenerated.

Activated carbon regeneration is a process whereby the adsorbed compounds are removed from combination with the carbon particles i.e. the particle vessel is emptied of its contents. Thermal regeneration involves heating the carbon with combustion products to temperatures of 1500° F.–1800° F. in a controlled atmosphere for thermal destruction of the adsorbed compounds. Steam regeneration, in addition to sterilization, desorbs the adsorbed contaminants from the carbon heating the bed to the boiling point of the contaminants. Chemical regeneration comprises contacting the spent carbon with a highly reactive aqueous acid or caustic solution to react the adsorbed compound into solution with a pumpable fluid.

Due to the extreme thermal or chemically reactive environment of regeneration, the regenerative process is not normally performed in the adsorbent bed vessel. Standard flow stream adsorption contacting vessels are fabricated from mild steel and given an inexpensive abrasion and chemical resistant interior lining or coating. If the vessel is to be used for steaming or regeneration of the carbon charge, the entire vessel must normally be fabricated of a thermally and chemically resistant material such as stainless steel. Moreover, if continuity of the treated water flow stream is essential, the number of adsorption/regeneration vessels must be multiplied so that flow stream treatment may continue through a useful carbon bed during the time period a spent carbon bed is regenerated.

Treatment system multiplication of adsorption vessels is often necessary due to other considerations such as removal of a vessel from the treatment line for backwash removal from the carbon bed of non-adsorbed filterant and for steam sterilization heating periods. When the expense of multiple adsorption vessels, each with an over-sized backwash volume capacity, is compounded by the cost of constructing all such vessels from stainless steel, in situ carbon regeneration capacity is difficult to economically justify.

It is therefor, an object of the present invention to teach the construction and operation of a substantially continuous treatment activated carbon adsorption system which minimally requires only one, mild steel adsorption vessel and a pair of considerably smaller stainless steel blow cases for on-site carbon washing, sterilization and regeneration, as well as carbon transfer.

Another object of the invention is to minimize the size and value of support equipment required for a steam sterilization and regeneration plant sufficient to sustain an activated carbon treatment bed.

Another object of the invention permits substantially uninterrupted adsorber operation with a single adsorber vessel.

SUMMARY

The present invention describes an up-flow carbon adsorption bed having a periodic or pulsed removal of a fractional percentage of the entire carbon bed charge.

Sequentially following the periodic removal of a spend carbon increment from the bottom or influent face of the bed, a fresh or regenerated carbon increment of substantially the same size is deposited on the top or effluent face of the bed.

The spent carbon increment is fluid transported through connective piping from the adsorption vessel bottom to the interior of a first of two small, stainless steel blow cases. The charged blow case is then isolated from the adsorption vessel by appropriate valve closures and an appropriate sterilization and regeneration medium such as steam, solvent, acid or caustic is admitted. Such sterilization and regeneration treatment normally requires an extended period of time, during which, the adsorption bed functions normally.

The sterile and regenerated carbon charge which replaces the spent charge within the adsorption vessel, is blown under pneumatic or hydraulic pressure from the other of the two blow cases.

BRIEF DESCRIPTION OF THE DRAWING

The single FIGURE of the drawing illustrates a hydraulic schematic of the basic invention system.

DESCRIPTION OF THE PREFERRED EMBODIMENT

Relative to the hydraulic schematic of the drawing, the invention basically comprises at least one conventional, mild steel pressure vessel 10 prepared with an appropriate liner to receive an up-flow bed of granular activated carbon. Representative quantities may be a 40,000 pound quantity of activated carbon within the vessel 10 for adsorptively treating a 400,000 gallon per day flow of industrial waste water over a 30 minute contact interim.

Appropriate connections to vessel 10 receive piping conduits for the raw water influent stream 100 near the vessel 10 bottom and the treated effluent stream 200 near the vessel top. Also connected to the vessel 10 are carbon transfer manifolds 20 at the vessel bottom and manifold 30 at the vessel top.

Carbon storage vessel 11 provides an unpressurized receptacle for spent carbon to be removed from the system for disposal or regeneration treatment not available from the present system. Pipe 21 connects the spent carbon tank 11 to the carbon removal manifold 20. Eductor 61 is energized by water pressure system 60 to facilitate carbon removal from the storage tank 11.

Carbon storage vessel 12 provides an unpressurized receptacle for fresh or regenerated carbon to be added to the system for make-up of attritional losses or replacement of removed carbon. Pipe 32 connects the fresh carbon storage vessel 12 to the fresh carbon supply manifold 30. Eductor 62 facilitates such transfer.

The two blow cases 13 and 14 are substantially identical strainless steel pressure vessels, each having a carbon bed capacity approximately 5 to 25 percent of the adsorber bed 10 capacity plus volume for backwash expansion. Valved conduits 23 and 24 connect the respective blow cases to the carbon removal manifold 20 and valved conduits 33 and 34 respectively connect the flow cases to the carbon supply manifold 30.

Piping system 40 selectively connects both blow cases 13 and 14 with appropriate sources of regeneration medium which may be steam, solvent, acid or caustic. The system illustrated suggests an up-flow regeneration medium route but it should be understood that certain conditions or system circumstances may dictate a down-flow route. The regeneration medium exit flow system 50 may include a steam condenser or spent regenerant recovery vessel 15. Such apparatus may be extremely useful in recovering certain thermally volatile compounds that constitute environmental hazards. Steam regeneration desorbs the compounds from the carbon for transport into the condenser 15. Heat removal from the compound vapor laden stream traps the toxic compounds in solution or mixture with the resulting condensate for controlled disposal.

The normal or steady state operation of the present system comprises regulated flow of raw water influent 100 into the bottom of the up-flow adsorption column 10. Treated effluent 200 is discharged at the top of the column.

Periodically, such as daily, the removal manifold isolation valve 21 opened while the influent valve is kept open to permit a turbulent, down-flow transport of spent carbon from the influent face of the adsorption column. Such spent carbon is directed from the manifold 20 into an empty one of the two blow cases, 13 for example. When the blow case 13 is completely charged, isolation valve 21 is closed and isolation valve 31 opened to receive a corresponding quantity of regenerated carbon from the other blow case 14. When the transfer is complete, isolation valve 31 is again closed and the adsorber column and treated water flow returned to normal operation.

Upon completion of the spent carbon pulse to the blow case 13, the case is isolated from the manifolds 20 and 30 and the regeneration process begun. Depending on the pulse size, the type of loading and degree of saturation, the regeneration process may require 1 to 10 hours. In many cases, the regeneration process is by chemical or solvent desorption. In as many other cases, only steam regeneration is required. In any case, the regeneration period continues for no longer than the programmed carbon pulse interim. When complete, the regenerated pulse stands ready for recharging the adsorber column upon the successive pulse interim.

Having fully described our invention, we claim:

1. An apparatus for adsorptively removing select compounds from a fluid flow stream comprising:
    A. a vertical pressure contacting vessel charged with a column of particulate, activated carbon;
    B. a valved influent conduit at one end of said contacting vessel and a valved effluent conduit at the other end;
    C. first manifold means connecting said contacting vessel one end to both of at least two, high temperature capacity, steam regeneration vessels, said steam regeneration vessels respectively having a fractional volume capacity less than said activated carbon column;
    D. second manifold means connecting said contacting vessel other end with both of said two steam regeneration vessels;
    E. first means including said first manifold means to remove a first fractional portion of said activated carbon column from said one end of said contacting vessel and deposit said first fractional portion in a first one of said regeneration vessels;
    F. second means including said second manifold means to remove a regenerated portion of carbon substantially equal to said first portion from the second one of said regeneration vessels and deposit said second portion at the other end of said contacting vessel, and;
    G. steam supply means connected to said first and second regeneration vessels for regeneration of said first portion of activated carbon simultaneous with the continuance of said fluid flow stream through said influent and effluent conduits and through said column of activated carbon.

2. An apparatus as described by claim 1 comprising closed container heat exchange means for condensing steam effluent from said first portion of activated carbon.